(12) United States Patent
Pagot et al.

(10) Patent No.: US 7,318,314 B2
(45) Date of Patent: Jan. 15, 2008

(54) METHOD OF CONTROLLING A SUPERCHARGED INTERNAL-COMBUSTION ENGINE WITH AT LEAST TWO CYLINDERS AND ENGINE USING SUCH A METHOD

(75) Inventors: Alexandre Pagot, Rueil Malmaison (FR); Gaétan Monnier, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/012,123

(22) Filed: Dec. 16, 2004

(65) Prior Publication Data

US 2005/0138928 A1 Jun. 30, 2005

(30) Foreign Application Priority Data

Dec. 18, 2003 (FR) ................................. 03 14967

(51) Int. Cl.
*F02B 33/44* (2006.01)
*F02B 75/02* (2006.01)
*F01L 1/34* (2006.01)

(52) U.S. Cl. ............... 60/605.1; 123/90.15; 123/90.16; 123/316

(58) Field of Classification Search ............... 60/605.1, 60/597–598; 123/90.15, 90.16, 90.17, 90.18, 123/90.6, 316
See application file for complete search history.

(56) References Cited

U.S. PATENT DOCUMENTS

| | | | | |
|---|---|---|---|---|
| 1,895,380 A | * | 1/1933 | Buchi ..................... | 60/605.1 |
| 2,344,993 A | * | 3/1944 | Lysholm .................. | 123/90.6 |
| 2,793,631 A | * | 5/1957 | Schilling .................. | 60/605.1 |
| 3,768,248 A | * | 10/1973 | Grgurich et al. ........... | 60/605.1 |
| 4,217,866 A | | 8/1980 | Nakajima | |
| 4,385,598 A | * | 5/1983 | Nakajima et al. .......... | 123/76 |
| 4,424,790 A | * | 1/1984 | Curtil ..................... | 123/90.6 |
| 4,561,253 A | * | 12/1985 | Curtil ..................... | 123/90.6 |
| 4,733,535 A | | 3/1988 | Le Creurer et al. ........ | 60/605.1 |
| 4,964,375 A | * | 10/1990 | Takeyama et al. ......... | 123/90.16 |
| 5,421,308 A | * | 6/1995 | Hitomi et al. ............. | 123/90.15 |
| 6,574,961 B2 | * | 6/2003 | Shiraishi et al. ........... | 60/605.1 |
| 7,028,652 B2 | * | 4/2006 | Iwashita et al. ........... | 123/90.15 |
| 2004/0255579 A1 | * | 12/2004 | Leduc et al. .............. | 123/90.15 |

FOREIGN PATENT DOCUMENTS

GB 338872 * 11/1930
JP 01104922 A * 4/1989

* cited by examiner

*Primary Examiner*—Thai-Ba Trieu
(74) *Attorney, Agent, or Firm*—Antonelli, Terry, Stout & Kraus, LLP.

(57) ABSTRACT

A supercharged internal-combustion engine has at least two cylinders with a combustion cycle during which a cylinder (10) of the engine is in the intake phase with burnt gas scavenging in the vicinity of the top dead center (TDC) thereof while another cylinder is in the exhaust phase in the vicinity of the bottom dead center (BDC) thereof, the cylinders having at least one intake (12) with an intake valve ($14_1$, $14_2$, $14_3$, $14_4$) and at least one exhaust (18) with an exhaust valve ($20_1$, $20_2$, $20_3$, $20_4$). Controlling the engine includes carrying out scavenging of the burnt gases of the cylinder in the intake phase by a valve overlap stage by opening simultaneously its exhaust ($20_1$) and intake ($14_1$) valves, and controlling opening of exhaust valve ($20_3$) of the cylinder in the exhaust phase so that, during at least part of the overlap stage, the exhaust pressure (Pe) of the cylinder in the intake phase is lower than its intake pressure (Pa).

2 Claims, 1 Drawing Sheet

METHOD OF CONTROLLING A SUPERCHARGED INTERNAL-COMBUSTION ENGINE WITH AT LEAST TWO CYLINDERS AND ENGINE USING SUCH A METHOD

FIELD OF THE INVENTION

The present invention relates to a method of controlling a supercharged internal-combustion engine with at least two cylinders and to an engine using such a method.

BACKGROUND OF THE INVENTION

Generally, the power delivered by an internal-combustion engine is a function of the amount of air fed into the combustion chamber of this engine, an amount of air which is itself proportional to the density of this air. As it is well known, if high power is required, the intake air can be compressed, by any compression means such as a turbosupercharger, before it is fed into the cylinder of the engine, to obtain air supercharging in this cylinder.

In order to increase this amount of air in the cylinder and, in case of a spark-ignition engine, to reduce the engine knock sensitivity, the residual burnt gases in the combustion chamber are discharged, before the end of the engine exhaust phase, to be replaced by supercharged air, a stage that is commonly referred to as burnt gas scavenging.

This scavenging can be obtained by carrying out, in the vicinity of the top dead center of a cylinder ending its exhaust phase and starting its intake phase, overlapping of the exhaust and intake valves, as described in U.S. Pat. No. 4,217,866 for an indirect-injection engine. This overlap is obtained by opening simultaneously, for some degrees to some ten degrees of crankshaft rotation angle, the exhaust and intake valves of the cylinder at the end of the exhaust phase and in the vicinity of the top dead center (TDC) of its piston. This cylinder therefore comprises a specific intake means for non-carbureted supercharged air as a complement to a conventional intake means for feeding carbureted supercharged air into the combustion chamber, each means consisting of a pipe and of a valve. In this configuration, this burnt gas scavenging is carried out by overlap of the exhaust valves and of the non-carbureted supercharged air intake valve, so that this air, whose pressure is higher than at the exhaust, is fed into the combustion chamber and scavenges these gases to discharge them through the exhaust valves and thus occupies the volume freed by these gases. At the end of the scavenging stage, the exhaust valves close and carbureted supercharged air is fed into the combustion chamber through the other intake means provided with a fuel nozzle.

Although this type of engine runs satisfactorily, it involves drawbacks that are by no means insignificant.

In fact, to carry out such scavenging, the supercharged air intake pressure has to be higher than the burnt gas exhaust pressure in the vicinity of the top dead center of the piston so as to drive these exhaust gases towards the exhaust valve and to replace them by supercharged air fed through the intake valve.

However, the use of a conventional turbosupercharger, which comprises a single inlet for the exhaust gas in the turbine, does not allow, in some cases, to carry out this scavenging for engines having at least two cylinders and more particularly for engines with four cylinders.

In fact, the exhaust gases leaving each cylinder through the exhaust means are sent to the single inlet of the turbine of the supercharger through a line connecting, directly or indirectly by means of an exhaust manifold, all the exhausts of all the cylinders to the turbine inlet.

Thus, at the start of each exhaust phase of a cylinder and upon opening of the exhaust valves, the exhaust pressure at the turbine inlet undergoes an increase for some crankshaft rotation angle degrees. This pressure increase has repercussions, through the manifold, on the exhaust valves of the other cylinders.

In a four-stroke engine having at least two cylinders, as in a four-cylinder engine, the working cycle of this engine is such that the start of the intake phase of a cylinder with opening of the intake valve starts substantially at the same time as the start of the exhaust phase of another cylinder with opening of the exhaust valve. Therefore, when the cylinder is in the intake phase with burnt gas scavenging by intake and exhaust valves overlap, the exhaust gases from the cylinder starting its exhaust phase communicate through the exhaust manifold with the cylinder starting its intake phase for which the exhaust valve is open to provide this scavenging. The exhaust gases present in the manifold are therefore at a higher pressure than the intake pressure and prevent, during valve overlap, discharge of the burnt gases through the exhaust valve of the cylinder starting its intake phase.

To overcome this problem, it is well-known to use a specific turbosupercharger referred to as double-flow supercharger. In this type of supercharger, the exhaust gas inlet at the level of the turbine is divided in two sections, a first section connected, directly or by means of a manifold, to the exhausts of part of the cylinders and a second section connected to the exhausts of the other cylinders. In order to avoid the aforementioned drawback, each section is connected to cylinders for which an intake phase of a cylinder and an exhaust phase of another cylinder do not occur simultaneously.

Thus, when one of the cylinders connected to a section of the supercharger starts its intake phase with burnt gas scavenging, the pressure of the exhaust gases of the cylinder starting its exhaust phase, which is connected to the other section of the supercharger, cannot hinder the burnt gas scavenging process.

This double-flow supercharger technology, although it gives satisfaction, is of a much higher cost than conventional single-inlet superchargers.

The present invention aims to overcome the aforementioned drawbacks by means of an engine control allowing to carry out any time scavenging of the burnt gases of a cylinder and to use an air supercharged by means of a single-inlet supercharger.

SUMMARY OF THE INVENTION

The invention thus relates to a method of controlling a supercharged internal-combustion engine having at least two cylinders with a combustion cycle during which a cylinder of the engine is in the intake phase with scavenging of the burnt gases in the vicinity of its top dead center while another cylinder is in the exhaust phase in the vicinity of its bottom dead center, the cylinders comprising at least one intake means with an intake valve and at least one exhaust means with an exhaust valve, characterized in that it consists in carrying out scavenging of the burnt gases of the cylinder in the intake phase by means of a valve overlap stage by opening simultaneously its exhaust and intake valves, controlling opening of the exhaust valve of the cylinder in the exhaust phase so that, during at least part of the overlap stage, the exhaust pressure of the cylinder in the intake phase is lower than its intake pressure.

This method can consist in controlling opening of the exhaust valve of the cylinder in the exhaust phase so that the exhaust pressure of the cylinder in the intake phase is equal to its intake pressure upon closing of its exhaust valve.

It can consist in controlling opening of the exhaust valve of the cylinder in the exhaust phase upon closing of the exhaust valve of the cylinder in the intake phase.

It can also consist in controlling opening of the exhaust valve of the cylinder in the exhaust phase so that the exhaust pressure of the cylinder in the intake phase is higher than its intake pressure upon closing of its exhaust valve, burnt gas scavenging being carried out at the start of the valve overlap stage.

It can also consist in opening the exhaust valve of the cylinder in the exhaust phase after closing of the exhaust valve of the cylinder in the intake phase.

The invention also relates to a supercharged internal-combustion engine with at least two cylinders comprising at least one intake means with an intake valve and at least one exhaust means with an exhaust valve, characterized in that it comprises means for controlling the exhaust valves so that the exhaust pressure of the cylinder in the intake phase with burnt gas scavenging is lower than its intake pressure, during at least part of the burnt gas scavenging stage.

The control means can comprise means of varying the phasing of the lift law for at least the exhaust valves.

The variation means can comprise VVT or VVA type control systems.

When supercharging of the intake air is provided by a turbosupercharger, this turbosupercharger comprises a single inlet.

BRIEF DESCRIPTION OF THE FIGURES

Other features and advantages of the invention will be clear from reading the description given hereafter by way of non limitative example, with reference to the accompanying drawings wherein.

DETAILED DESCRIPTION

Figure 1:
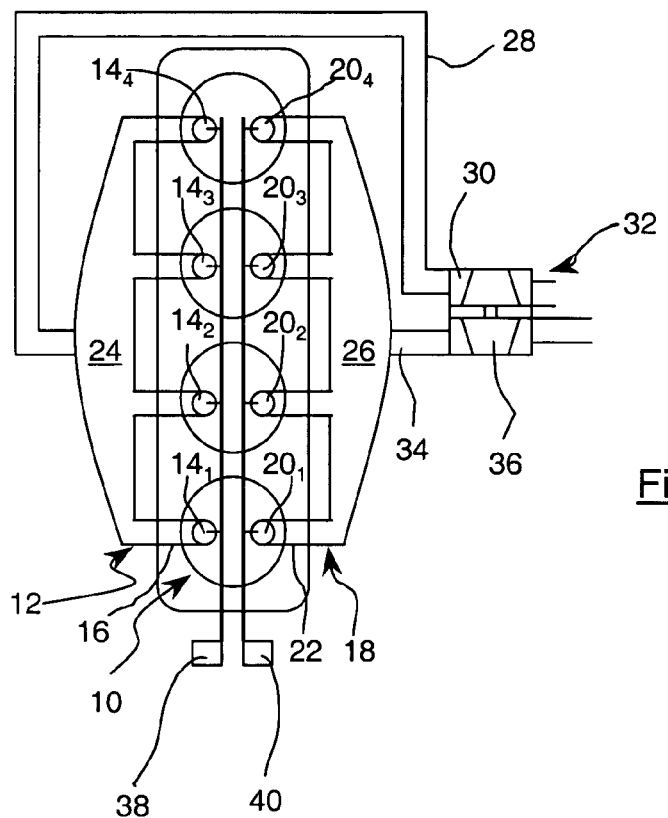
FIG. 1 shows a supercharged four-cylinder engine according to the invention.

In FIG. 1, a supercharged internal-combustion engine, for example a direct-injection engine, comprises four cylinders 10 or a multiple of four cylinders, such as eight or twelve straight or V cylinders. In the example of FIG. 1, the cylinders are successively referred to as cylinder No.1, cylinder No.2, cylinder No.3 and cylinder No.4 from the bottom of this figure. Each cylinder comprises at least one intake means 12 with an intake valve 14 (bearing reference numbers $14_1$ to $14_4$ depending on the cylinder that carries it) and an intake pipe 16, and at least one exhaust means 18 with an exhaust valve 20 (bearing reference numbers $20_1$ to $20_4$ depending on the cylinder that carries it) and an exhaust pipe 22. The pipes of intake means 12 open onto an intake manifold 24 whereas the pipes of exhaust means 18 open onto an exhaust manifold 26. The intake manifold is connected by a line 28 to the outlet of compression section 30 of a single-inlet turbosupercharger 32 whereas exhaust manifold 26 is connected by a line 34 to the single inlet of turbine 36 of this supercharger.

As it is known in the art, each cylinder comprises a piston moving in a reciprocating translation motion between an upper position referred to as top dead center (TDC) and a lower position referred to as bottom dead center (BDC) by means of a connecting rod connected to a crankpin of a crankshaft which such an engine is usually equipped with. This cylinder also comprises a combustion chamber delimited by the top of the piston and the top of the cylinder, into which intake means 12 and exhaust means 18 open.

Opening and closing of intake valves $14_1$ to $14_4$ and exhaust valves $20_1$ to $20_4$ is respectively controlled by means 38 and 40 allowing to vary the phasing of the lift laws for these valves, independently of one another or in association, such as means known as VVA (Variable Valve Actuation) or VVT (Variable Valve Timing), VVT type control means being preferably used.

In the example shown in this figure, the engine works with a cycle referred to as 1, 3, 4, 2 wherein, during the combustion cycle and at a determined angle of rotation of the crankshaft, a cylinder, such as cylinder No.1, is in the intake phase with a scavenging stage of the burnt gases present in the combustion chamber by simultaneous opening of intake valve $14_1$ and exhaust valve $20_1$, the next cylinder (cylinder No.2) is in the compression phase with exhaust valve $20_2$ and intake valve $14_2$ in closed position, cylinder No.3 is in the exhaust phase with opening of exhaust valve $20_3$ and the last cylinder (cylinder No.4) is in the expansion phase, exhaust valve $20_4$ and intake valve $14_4$ being closed.

In order to prevent the exhaust gases from cylinder No.3 from disturbing discharge of the exhaust gases during the burnt gas scavenging stage of cylinder No.1 in the intake phase, the exhaust valve of cylinder No.3 is opened in such a way that the exhaust gas pressure increase resulting from this opening does not disturb this discharge or that the overall balance is always in favour of the intake pressure.

By way of example, this can be carried out by opening the exhaust valve of cylinder No.3 in such a way that the exhaust pressure in exhaust manifold 26 is lower than the intake pressure throughout the burnt gas scavenging phase.

Figure 2:
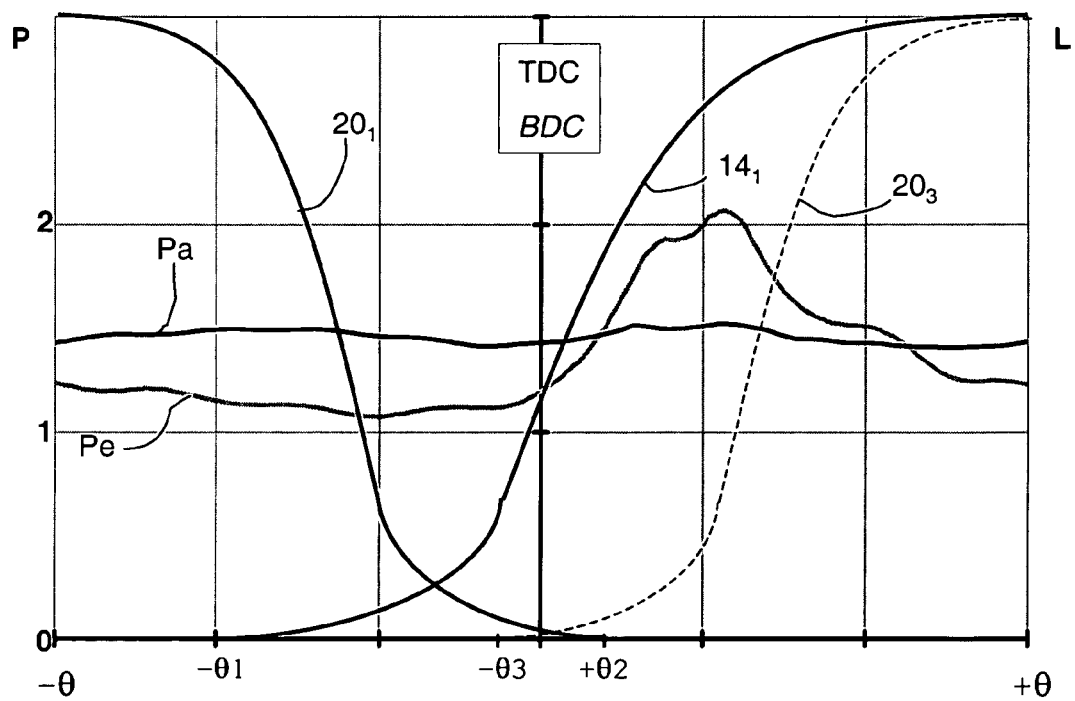
FIG. 2 is a graph with curves illustrating the intake and exhaust pressure (P in bar) of a cylinder in the burnt gas scavenging phase as a function of the crankshaft rotation (in degrees), the lift laws (L) for the intake and exhaust valves of a cylinder in the burnt gas scavenging phase and the lift law for the exhaust valve of another cylinder in the exhaust phase as a function of the rotation of this crankshaft.

FIG. 2 shows the variation of intake pressure Pa and of exhaust pressure Pe of cylinder No.1 as a function of the travel of the piston between a crankshaft angle $-\theta$ to $+\theta$ through the top dead center (TDC) of this piston. This figure also shows the lift laws for exhaust valve $20_1$ and intake valve $14_1$ during this piston travel. Finally, it also shows, in correspondence with this travel of the piston of cylinder No.1, the lift law (in dotted line) for exhaust valve $20_3$ of cylinder No.3 from its corresponding bottom dead center (BDC).

During the exhaust phase of cylinder No.1, intake valve $14_1$ is closed and exhaust valve $20_1$ opens. The exhaust gases present in the combustion chamber are discharged through this exhaust valve under the combined effect of the ascent of the piston to the TDC and the pressure difference between the pressure of these gases in the combustion chamber and exhaust pressure Pe in the manifold.

When the piston of this cylinder is in the vicinity of the TDC, i.e. some degrees to some ten degrees of crankshaft angle before this TDC, a valve overlap stage is carried out by means of control means 38, 40. This overlap is achieved by opening intake valve $14_1$ at angle $-\theta_1$ and by keeping exhaust valve $20_1$ open by changing the phasing of the lift laws for these valves. At this angle, intake pressure Pa at the intake of this cylinder is higher than pressure Pe at the exhaust of this cylinder. The residual burnt gases still present in the combustion chamber are therefore scavenged in the combustion chamber in order to be discharged through the exhaust valve and they are replaced by the supercharged air fed into this chamber. This burnt gas scavenging operation ends when exhaust valve $20_1$ closes at a crankshaft angle $+\theta2$ after the TDC. The angle range $-\theta1$ to $+\theta2$ around the TDC, which corresponds to the valve overlap stage with burnt gas scavenging, is defined in such a way that the maximum amount of residual burnt gases is discharged and replaced by supercharged air.

To ensure scavenging, pressure Pa has to be higher than pressure Pe, but a BDC of a cylinder in the exhaust phase, such as cylinder No.3, during which exhaust valve $20_3$ opens, corresponds to the TDC of cylinder No.1.

To prevent the opening of this exhaust valve from generating a pressure increase at the exhaust of cylinder No.1, via exhaust manifold 26, in such a way that this exhaust pressure is higher than the intake pressure of this cylinder, control means 40 open exhaust valve $20_3$ of cylinder No.3 in the vicinity of the end of the scavenging operation in cylinder No.1 or at the end of the scavenging operation in cylinder No.1 or after the end of this scavenging operation when exhaust valve $20_1$ of cylinder No.1 is closed.

This opening control of exhaust valve $20_3$ can also be such that the exhaust pressure is higher than the intake pressure in the vicinity of the end of the scavenging operation, but it is determined in such a way that the overall balance of the supercharged air intake is in favour of this air.

As shown in FIG. 2 illustrating an example where opening of exhaust valve $20_1$ is controlled at the end of the overlap stage, opening of exhaust valve $20_3$ of cylinder No.3 starts in the vicinity of its BDC at a crankshaft angle $-\theta3$ which corresponds to an angle that is very close to or that merges with closing angle $\theta2$ of the exhaust valve of cylinder No.1.

In practice, valve $20_3$ opens at an angle $-\theta3$ located some degrees or some ten degrees before angle $+\theta2$ to obtain a pressure difference between intake pressure Pa and exhaust pressure Pe that is always in favour of intake pressure Pa and almost zero, or even zero, when exhaust valve $20_1$ closes. In fact, upon opening of valve $20_3$ and as shown in the figure between angles $-\theta3$ and $+\theta2$, exhaust pressure Pe increases progressively as a function of the extent of the opening of this valve until it equals the intake pressure at angle $+\theta2$, then exceeds it from this angle. As already mentioned, opening of valve $20_3$ can be controlled at such an angle that the pressure difference between intake pressure Pa and exhaust pressure Pe, when exhaust valve $20_1$ closes, is in favour of intake pressure Pa. This opening is controlled in such a way that the balance is globally positive in the sense that the amount of supercharged air introduced at the start of the valve overlap stage is greater than the amount of residual burnt gas.

This is possible by carrying out, by means of VVT type control means 40, a phase shift in the lift law of exhaust valve $20_3$ in relation to its origin. More precisely, the start of the curve representative of this law at point $-\theta3$ will be further from opening point $-\theta1$ of the intake valve than the start of this curve representative of the lift law of exhaust valve $20_3$ without valve overlap.

Of course, in the above description, when the top dead center or the bottom dead center is mentioned for a piston, it also applies for the position of the crankpin to which it is connected by the connecting rod.

Furthermore, the above description applies to supercharged indirect-injection engines as well as supercharged direct-injection engines, notably spark-ignition engines.

The invention claimed is:

1. A method of controlling a supercharged internal-combustion engine having at least two cylinders with a combustion cycle during which a cylinder of the engine is in the intake phase with burnt gas scavenging in the vicinity of the top dead center thereof while another cylinder is in the exhaust phase in the vicinity of the bottom dead center thereof, the cylinders comprising at least one intake means with an intake valve and at least one exhaust means with an exhaust valve, characterized in that the method comprises:
   carrying out scavenging of the burnt gases of the cylinder in the intake phase by means of a valve overlap stage by opening simultaneously its exhaust and intake valves,
   controlling opening of the exhaust valve of the cylinder in the exhaust phase so that, during at least part of the overlap stage, an exhaust pressure of the cylinder in the intake phase is lower than an intake pressure of the cylinder in the intake phase, and so that the exhaust pressure of the cylinder in the intake phase is equal to the intake pressure of the cylinder in the intake phase upon closing of the exhaust valve of the cylinder in the intake phase.

2. A method of controlling a supercharged internal-combustion engine having at least two cylinders with a combustion cycle during which a cylinder of the engine is in the intake phase with burnt gas scavenging in the vicinity of the top dead center thereof while another cylinder is in the exhaust phase in the vicinity of the bottom dead center thereof, the cylinders comprising at least one intake means with an intake valve and at least one exhaust means with an exhaust valve, characterized in that the method comprises:
   carrying out scavenging of the burnt gases of the cylinder in the intake phase by means of a valve overlap stage by opening simultaneously its exhaust and intake valves,
   controlling opening of the exhaust valve of the cylinder in the exhaust phase so that, during at least part of the overlap stage, an exhaust pressure of the cylinder in the intake phase is lower than an intake pressure of the cylinder in the intake phase, and so that the exhaust pressure of the cylinder in the intake phase is higher than the intake pressure of the cylinder in the intake phase upon closing of exhaust valve of the cylinder in the intake phase.

* * * * *